(12) United States Patent
Amthor

(10) Patent No.: US 10,077,580 B2
(45) Date of Patent: Sep. 18, 2018

(54) ACTUATED LOCKING SYSTEM

(71) Applicant: Brian Robert Amthor, Gretna, VA (US)

(72) Inventor: Brian Robert Amthor, Gretna, VA (US)

(73) Assignee: Amthor International, Inc., Gretna, VA (US)

( * ) Notice: Subject to any disclaimer, the term of this patent is extended or adjusted under 35 U.S.C. 154(b) by 890 days.

(21) Appl. No.: 14/521,760

(22) Filed: Oct. 23, 2014

(65) Prior Publication Data

US 2015/0218852 A1 Aug. 6, 2015

Related U.S. Application Data

(60) Provisional application No. 61/936,638, filed on Feb. 6, 2014.

(51) Int. Cl.

| E05B 77/26 | (2014.01) |
|---|---|
| E05B 77/28 | (2014.01) |
| E05B 79/10 | (2014.01) |
| E05B 65/00 | (2006.01) |
| E05B 51/02 | (2006.01) |
| E05B 17/00 | (2006.01) |
| F16J 13/06 | (2006.01) |
| F16J 13/20 | (2006.01) |

(52) U.S. Cl.
CPC ........ *E05B 65/001* (2013.01); *E05B 17/0029* (2013.01); *E05B 51/02* (2013.01); *F16J 13/06* (2013.01); *F16J 13/20* (2013.01); *Y10T 292/1043* (2015.04)

(58) Field of Classification Search
CPC .... E05B 65/001; E05B 17/0029; E05B 51/02; F16J 13/06; F16J 13/20; Y10T 292/1043; Y10T 292/20; Y10T 292/202
See application file for complete search history.

(56) References Cited

U.S. PATENT DOCUMENTS

| 3,409,320 | A | * | 11/1968 | Eckerle | ............... | A47L 15/4259 |
|---|---|---|---|---|---|---|
| | | | | | | 292/113 |
| 4,017,181 | A | * | 4/1977 | Komaba | ................... | B62L 3/02 |
| | | | | | | 271/127 |
| 4,017,281 | A | * | 4/1977 | Johnstone | .......... | B01D 46/0057 |
| | | | | | | 15/340.1 |
| 6,347,485 | B1 | * | 2/2002 | Hebda | ................. | E05B 17/0029 |
| | | | | | | 292/341.16 |
| 6,386,598 | B1 | * | 5/2002 | Dykstra | ................. | B65D 90/00 |
| | | | | | | 220/315 |
| 6,457,674 | B2 | * | 10/2002 | Erben | ................... | B64C 1/1407 |
| | | | | | | 244/129.4 |

\* cited by examiner

*Primary Examiner* — Carlos Lugo
*Assistant Examiner* — Thomas L Neubauer
(74) *Attorney, Agent, or Firm* — Dunlap Bennett & Ludwig PLLC

(57) ABSTRACT

An actuated locking system for locking a pressurized door assembly is provided. The locking system provides an actuator to position a claw arm having a hook latch in a locked and unlocked configuration. The claw arm may include a base element connected to the door assembly so that the hook latch is adjacent to a cooperating latching notch. The actuator may be connected to the base element on one end and on an opposing end pivotally connected to a pair of boomerang arms, which in turn is pivotally connected to a pair of fork arms, which in turn is operably connected to position the claw arm in the locked configuration and the unlocked configuration.

10 Claims, 5 Drawing Sheets

ACTUATED LOCKING SYSTEM

CROSS-REFERENCE TO RELATED APPLICATION

This application claims the benefit of priority of U.S. provisional application No. 61/936,638, filed 6 Feb. 2014, the contents of which are herein incorporated by reference.

BACKGROUND OF THE INVENTION

The present invention relates to locking systems and, more particularly, to an actuated locking system operable from a safe distance that provides a consistent latching force.

Currently, the standard design for industrial vacuum tanks involves a pressurized door held in place by a number of manually-operated wing nuts or similar fasteners. This typically requires the user to climb ten to thirteen feet off the ground, for example in the case of a truck-mounted vacuum tank, in order to reach the nuts that are located near the top of the tank. Causing both a falling hazard and an inconvenience as the operator must simultaneously props their self up and while manipulating the bolts from an awkward position. Moreover, such awkward position heightens the likelihood of human error so as to unevenly tighten the manually-operated wing nuts, causing a separate hazard.

As can be seen, there is a need for an actuated locking system operable from a safe distance from a safe distance that provides a consistent latching force.

SUMMARY OF THE INVENTION

In one aspect of the present invention, a locking system for an outwardly opening door of a tank, the door having a plurality of latching notches formed along the periphery thereof, comprises: a door pivotally connected to the tank for selectively covering a pressurized tank opening; at least one locking mechanism operably coupled along the periphery of the tank opening, the at least one locking mechanism is positionable in a locked configuration preventing the door from being opened and an unlocked configuration, and wherein each locking mechanism comprises; an base element having a front edge and a back edge, wherein the base element is connected to the tank so that the front edge is adjacent to a cooperating latching notch; a pair of brackets rigidly connected to the base element near the front edge; a claw arm disposed between the pair of brackets, wherein the claw arm has a lower portion and an upper portion, wherein the lower portion defines a curved slot, and wherein the upper portion forms a hook configured to securely engage the adjacent latching notch when the locking mechanism is in the locked configuration; a slot fastener extending between and connecting to the pair of brackets, wherein the slot fastener is received through the curved slot; a pair of boomerang arms, each having a first wing tri-point, a second wing tri-point and a head tri-point, wherein each head tri-point is pivotably coupled to the pair of brackets; a pair of fork arms, each having a fork end and an opposing end, wherein each fork end is pivotably coupled to the second wing tri-point; and an actuator operable to position the latch and lock mechanism in the locked configuration and the unlocked configuration.

In another aspect of the present invention, a latch and lock mechanism for a pressurized door assembly providing a cooperating latching notch, wherein the mechanism is positionable in a locked configuration preventing the door assembly from being opened and an unlocked configuration, comprises: an base element having a front edge and a back edge, wherein the base element is connected to the door assembly so that the front edge is adjacent to a cooperating latching notch; a pair of brackets rigidly connected to the base element near the front edge; a claw arm disposed between the pair of brackets, wherein the claw arm has a lower portion and an upper portion, wherein the lower portion defines a curved slot, and wherein the upper portion forms a hook configured to securely engage the adjacent latching notch when the locking mechanism is in the locked configuration; a slot fastener extending between and connecting to the pair of brackets, wherein the slot fastener is received through the curved slot; a pair of boomerang arms, each having a first wing tri-point, a second wing tri-point and a head tri-point, wherein each head tri-point is pivotably coupled to the pair of brackets about a lock limit pin; a pair of fork arms, each having a fork end and an opposing end, wherein each fork end is pivotably coupled to the second wing tri-point; and an actuator operable to position the latch and lock mechanism in the locked configuration and the unlocked configuration.

In certain embodiments, the actuator wherein the actuator has a first end and a second end, wherein the first end is pivotably coupled to the base element and wherein the second end is pivotably coupled to the pair of first wing tri-points.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an actuated locking system for locking a pressurized door assembly, wherein an actuator extends and retracts to position a claw arm having a hook latch in a locked and unlocked configuration. The claw arm may include a base element connected to the door assembly so that the hook latch is adjacent to a cooperating latching notch. The actuator may be connected to the base element on one end and on an opposing end pivotally connected to a pair of boomerang arms, which in turn is pivotally connected to a pair of fork arms, which in turn is operably connected to position the claw arm in the locked configuration and the unlocked configuration.

Figure 1:
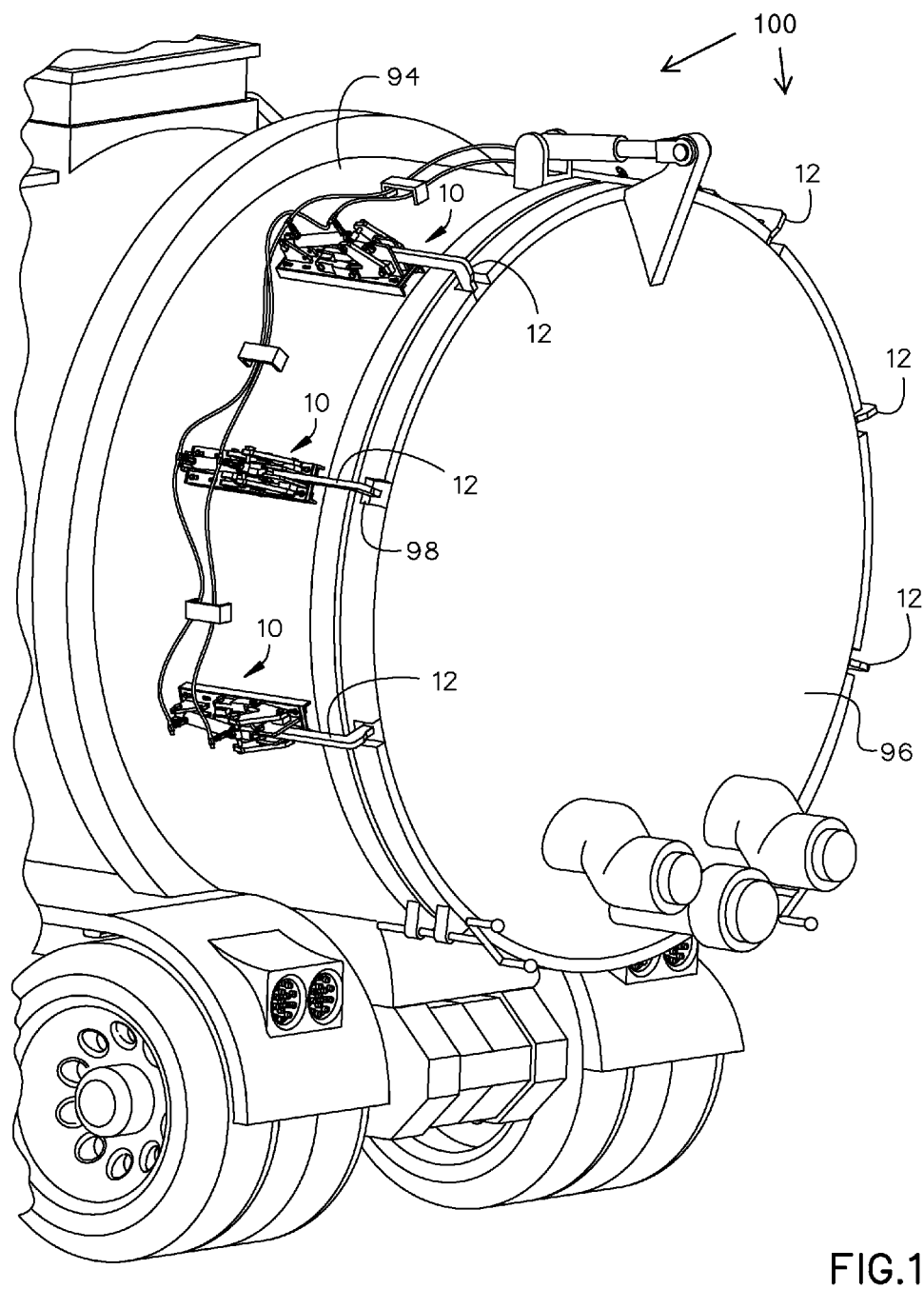
FIG. 1 is a perspective detail view of an exemplary embodiment of the present invention, illustrating use in a locked configuration.
Figure 2:
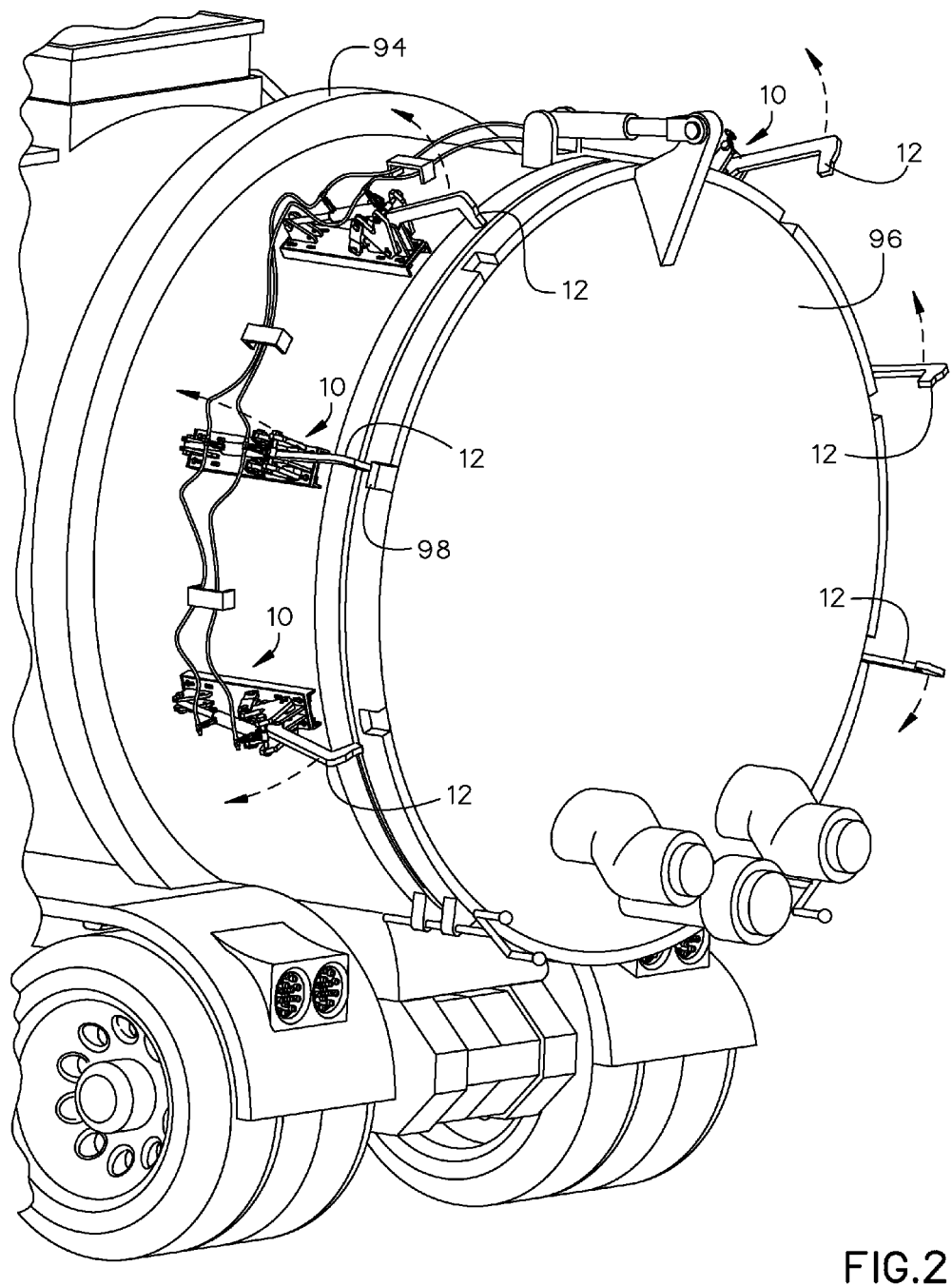
FIG. 2 is a perspective detail view of an exemplary embodiment of the present invention, illustrating use in an unlocked configuration.

Referring to FIGS. 1 through 9, the present invention provides a locking system 100 for larger doors, such as the pressurized doors 96 of industrial vacuum tanks 94. The locking system 100 may include at least one locking mechanism 10 generally located along the periphery of the tank door 96, wherein the tank door 96 generally rotates about a hinge along an upper edge, as illustrated in FIGS. 1 and 2. In a locked configuration the at least one locking mechanism 10 urges a claw arm 12 to latch on to an adjacent latch notch 98 along the periphery of the tank door 96, wherein the urging maintains a generally axial and downwardly force through the claw arm 12. During opening, each locking mechanism 10 drives the claw arm 12 to unlatch from the latch notch 98, resulting in an unlocked configuration. To facilitate the positioning of the locked and unlocked configuration, power, for example, but not limited to, hydraulic power in the form of pressurized hydraulic fluid is supplied by a hydraulic system.

Specifically, each locking mechanism 10 includes a base element 104 supporting an actuator 102 that is operably engaged to a pair of boomerang arms 26 pivotably coupled to a pair of fork arms 18 that in turn drive the claw arm 12 to and from the locked and unlocked configuration. Each locking mechanism 10 may be made of aluminum or any material providing suitable strength needed for the present invention to function as herein disclosed.

The base element 104 may include a base channel 44 and a mount base plate 40, each substantially sharing a front edge 108 and a back edge 106. The base channel 44 may be an elongated channel having a plurality of holes 46 along the length of its base. The mount base plate 40 may be a generally rectangular or any other shape cooperating with the base channel 44. The mount base plate 40 may provide a plurality of base slots 42 to which the base channel 44 may be adjustably fastened to by use of fasteners 72, such as but not limited to bolts and the like. The base channel 44 legs may be welded or otherwise rigidly connected about the periphery of the tank door 96.

The actuator 102 having a first end 112 and a second end 114 and may include a tube 48 along which a piston 52 slides when extending and contracting under pressure, for example hydraulic pressure. The actuator 102 may be a linear actuator movable from a contracted position and an extended position when facilitated by, for example, hydraulic power.

The first end 112 of the actuator 102 may be pivotally mounted to the base plate 40. In certain embodiments, a mounting pivot fastener 68 may facilitated the pivotable connection by being received through a first actuator hole 54 formed near the first end 112 of the actuator 102. The pivot fastener 68 may be a bolt-like shaft extended between and connected near its two opposing end to a pair of mounting plates 34 by, in some embodiments, the aid of a nut fastener 70. The pair of mounting plates 34 may form cooperating holes 36, 38 to facilitate the pivot fastener 68 connection.

The pair of mounting plates 34 may be welded or otherwise rigidly connected to the mount base plate 40 near the back edge 106, as illustrated in FIGS. 3 through 8.

Figure 4:
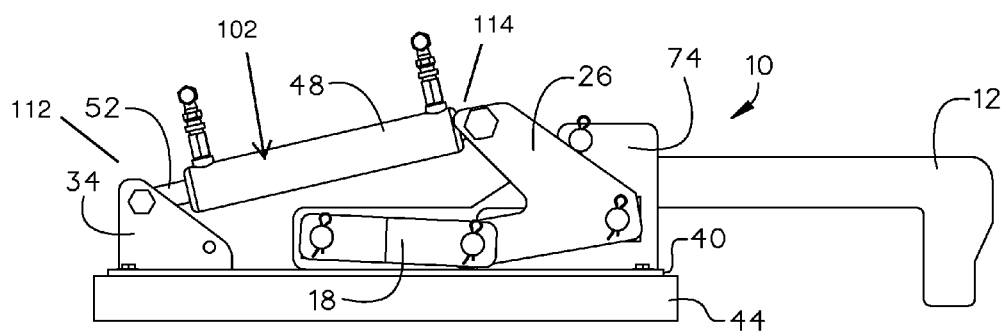
FIG. 4 is a side view of an exemplary embodiment of the present invention, illustrated in the locked configuration.

The second end 114 of the actuator 102 may be pivotally coupled to a first wing tri-point 28 of the pair of boomerang arms 26 so that the actuator 102 extends upwardly from the first end 112 to the second end 114, as illustrated in FIG. 4. In certain embodiments, the second end 114 may be pivotally coupled by a boomerang pivot fastener 60 such as a bolt-like shaft extended through a second actuator hole 50 and into and through two opposing aligned holes formed within the first wing tri-point 28. The boomerang pivot fastener 60 may be secured therein by the aid of a nut fastener 62.

Figure 9:
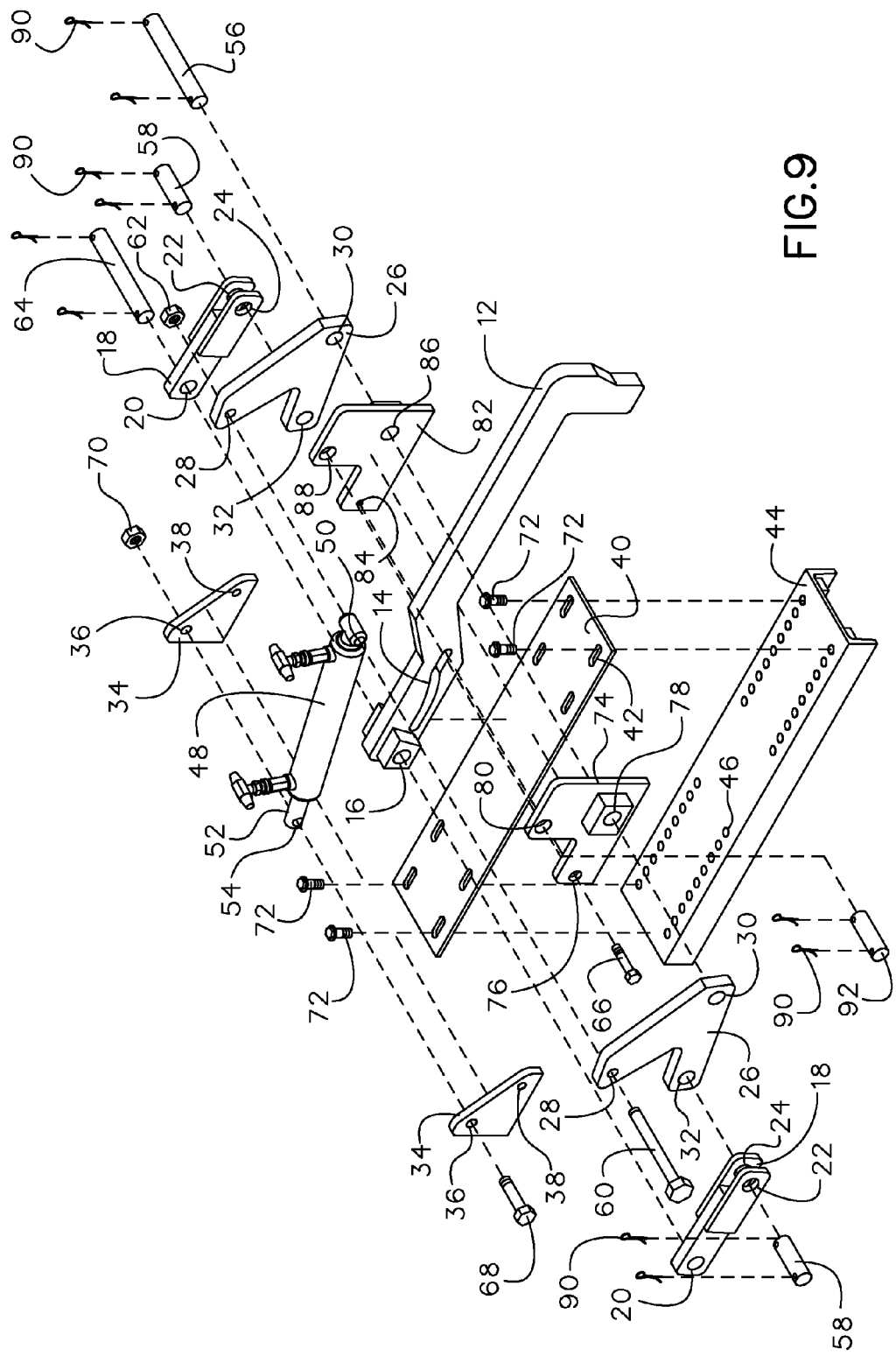
FIG. 9 is an exploded view of an exemplary embodiment of the present invention.

Similarly, a second tri-wing point 32 of the pair of boomerang arms 26 is pivotally coupled to the cooperating pair of fork arms 18, in certain embodiments, by a pivotal fastener 58 extending between each fork arm 18 and received through complementary fork arm holes 22, 24 so as to be secured thereto, as illustrated in FIG. 9. In some embodiments, a pair of opposing pin clips 90 may secure the pivotal fastener 58.

Similarly, the fork arm holes 22, 24 may be disposed at a fork end of each fork arm 18 while the opposing end of each fork arm 18 may be pivotally coupled to the claw arm 12 by means of a pivot fastener 64. In certain embodiments, the pivot fastener 64 may extend between a pivot hole 20 formed in each fork arm 18 and through an aligned claw hole 16 formed in an end of the claw arm 12. The pivot fastener 64 is slidably received through all three holes 20, 16, 20 and secured by, for example but not limited to, a pair of opposing pin clips 90, as illustrated in FIG. 9.

Similarly, the head tri-point 30 may be pivotally coupled to a locked limit pin 56 extending between a pair of spaced apart front brackets 74, 82, respectively. The locked limit pin 56 may be secured within lock holes 78, 86 of the brackets 74, 82, in some embodiments, by a pair of opposing pin clips 90, as illustrated in FIG. 9.

The front brackets 74, 82 may include two other sets of cooperating holes: two top holes 80, 88 and two back holes 76, 84. The two top holes 80, 88 may securely receive an unlocked limit pin 92. The two back holes 76, 84 may securely receive a slot fastener 66.

The claw arm 12 may include a body that terminates near a claw hole 16 on one end and, on the opposing end, in a hook adapted to be received by the adjacent latch notch 98. The body may include a lower portion interconnected to a parallel upper portion by a slanted portion. The lower portion may define a curved slot 14. In certain embodiments, a diagonal ramp element extends between the lower portion and the upper portion.

Figure 5:
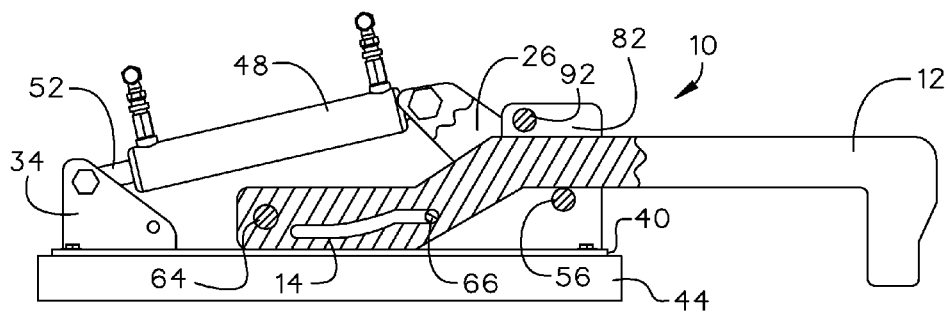
FIG. 5 is a partial section view of an exemplary embodiment of the present invention, taken along line 5-5 in FIG. 3.
Figure 6:
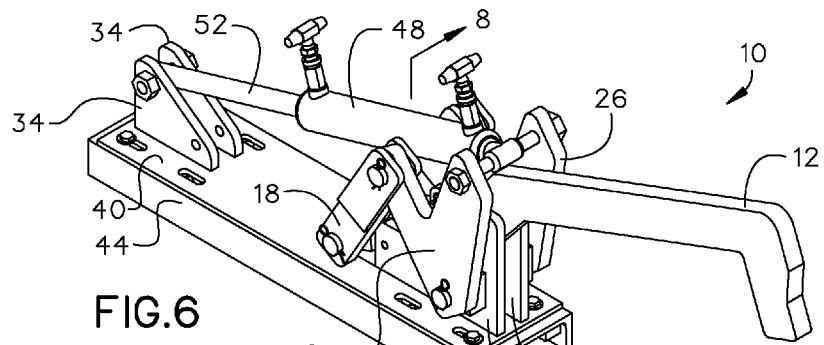
FIG. 6 is a perspective view of an exemplary embodiment of the present invention, illustrated in the unlocked configuration.
Figure 7:
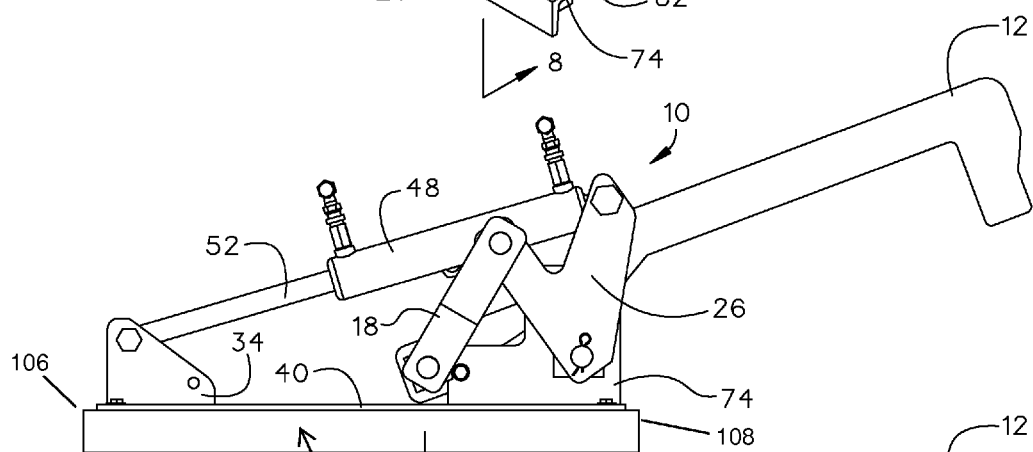
FIG. 7 is a side view of an exemplary embodiment of the present invention, illustrated in the unlocked configuration.
Figure 8:
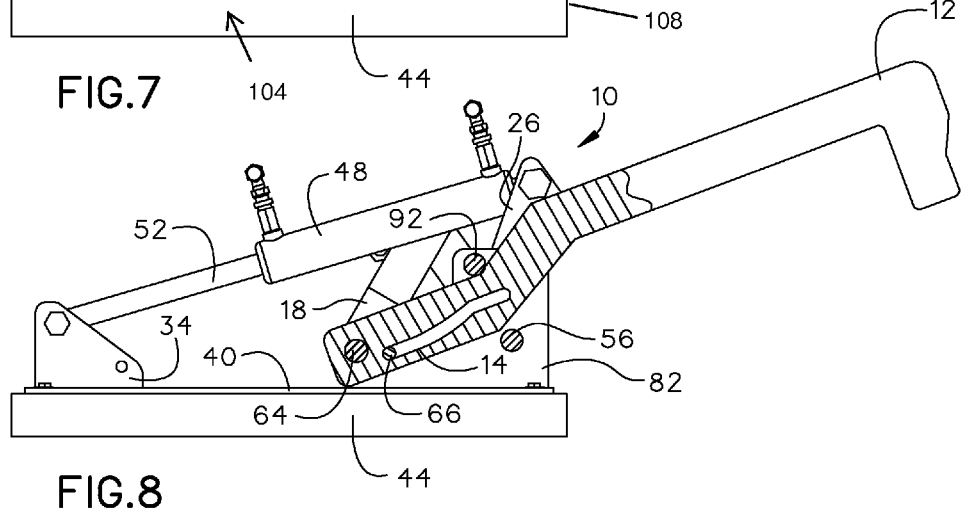
FIG. 8 is a partial section view of an exemplary embodiment of the present invention, taken along line 8-8 in FIG. 6.

A portion of the claw arm 12 body is disposed between the pair of spaced apart front brackets 74, 82 so that the slot fastener 66 extending between the front brackets 74, 82 is received through the curved slot 14. Similarly, the locked limit pin 56 and the unlocked limit pin 92 extending between the front brackets 74, 82 beneath a lower surface of the body and above an upper surface of the body, respectively, as illustrated in FIG. 5. The locked limit pin 56 and the unlocked limit pin 92 are not vertically aligned so as to allow the claw arm 12 to pivot upwardly about the unlocked limit pin 92 from the locked configuration. The locked limit pin 56 may provide a seat for the body of the claw arm 12 to rest upon when in the locked position.

Accordingly, actuation of the actuator 102 toward the extended position causes the pair of boomerang arms 26 first wing tri-point 28 to drive upwardly and pivot about the boomerang pivot fastener 60, thereby urging the head tri-point 30 to pivot about the locked limit pin 56, thereby driving the second wing tri-point 32 upwardly as it rotates about the pivotal fastener 58.

Accordingly, the upwardly driven second wing tri-point 32 and engaged pivotal fastener 58 urges the pair of interconnected fork arms 18 on the fork end to be driven upwardly and pivot about the pivotal fastener 58, thereby urging the opposing end of the pair of fork arms 18 to be driven toward the front edge 108 as it pivots about the pivot fastener 64, causing the pivot fastener 64 and the engaged claw arm 12 to slide upwardly and toward the front edge 108 along the curved slot 14 about the rigid slot fastener 66. The locked limit pin 56 and the unlocked limit pin 92 may act as bumper for the claw arm as it slides along the curved slot 14 to and from the unlocked configuration.

Figure 3:
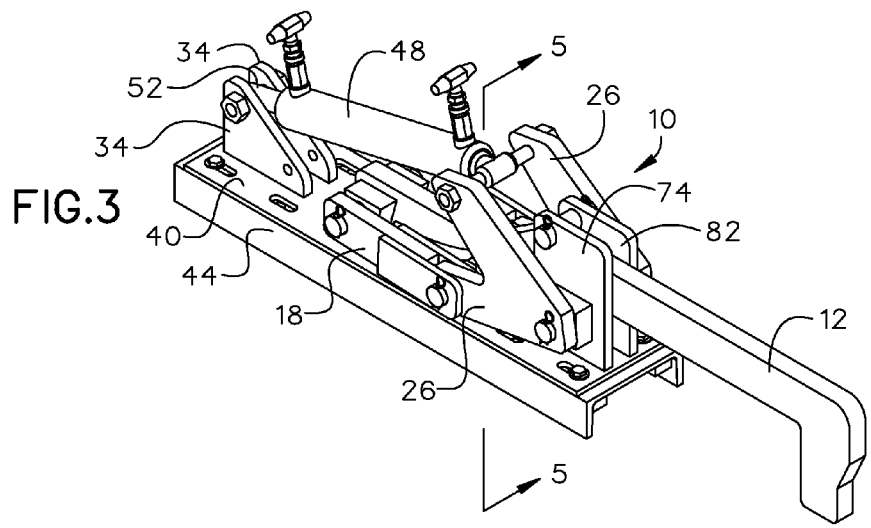
FIG. 3 is a perspective view of an exemplary embodiment of the present invention, illustrated in the locked configuration.

Similarly actuation of the actuator 102 toward the contracted position causes a reversed motion, as illustrated in FIGS. 3 through 5, and translating into the locked configuration. In the locked configuration the pair of boomerang arms 26 may be angled slightly downwardly, relative to the mount base plate 40, as illustrated in FIG. 4. This slight downwardly angle causes the force transmitted to press down said mount base plate 40, so that when the unlocking configuration is initially engaged, the pair of boomerang arms 26 are urged violently upward.

A method of using the present invention may include the following. The locking system 100 disclosed above may be provided. A user must determine the number and positioning of the at least one locking mechanism 10 necessary to contain the forces of the pressurized door 96 of each relevant industrial vacuum tanks 94 (based on size and internal pressure) without overstressing and causing the parts of the at least one locking mechanism 10 or welds to yield. The user may then be securely weld the predetermined number of the base channel 44 along the periphery of the pressurized door 96 at generally evenly spacing, while being mindful of the need for the hook of the claw arm 12 to latch to the adjacent latch notch 98. Care must be given in the longitudinal placement of each locking mechanism 10, in order for the hook of the claw arm 12 to create a tight seal on the pressurized door 96 when in the locked configuration. The lateral positioning is also important to note, because the rear door rises on a hinge placed generally near the top center of the tank 94. If the locking mechanism 10 is located too close to the hinge, it is possible that the hooked claw arm 12 will not move far enough out of the way, causing it to interfere with the travel of the door 94 on its hinge. Once the predetermined locking mechanisms 10 are properly fitted on the tank 94 and the hydraulic lines and equipment are installed, the locking mechanisms 10 and the door 94 can be operated. Before using the locking mechanisms 10 to seal the door 94, the door 94 controls must be activated to be fully closed. Once the door 94 is closed and the bottom bolts are screwed into place, the locking mechanism 10 can be activated via a main actuator on a control panel accessible from the ground. It is important to make sure the actuator 102 has been completely contracted before letting off of the main actuator, so that a firm seal is created and the actuator 102 enters its locked configuration. This locked configuration is the state at which the linkages formed by the pair of boomerang arms 26 and the pair of fork arms 18 have moved down to an angle past parallel, so that the force on the hook of the claw arm 12 will be transmitted downward into the base plate 40 instead of upward. This prohibits the locking mechanism 10 from moving toward an unlocked configuration if cylinder pressure was lost, which would allow the claw arm 12 to move forward, releasing the seal on the door 94. In order to open the rear door 94 properly, these steps are simply performed in reverse, by extending in concert the actuators 102 of each locking mechanism 10 (via the main actuator of the control panel) until the claw arms 12 are fully extended and out of the way, unscrewing the bolts at the bottom of the rear door 94, and then opening the rear door 94 (also from the control panel). Using these procedures, the door 94 can be closed and sealed or released and opened without the operator ever leaving the ground.

It should be understood, of course, that the foregoing relates to exemplary embodiments of the invention and that modifications may be made without departing from the spirit and scope of the invention as set forth in the following claims.

What is claimed is:

1. A locking mechanism positionable in a locked configuration and an unlocked configuration, comprises:
   a base element having a front edge and a back edge;
   a pair of brackets rigidly connected to the base element near the front edge;
   a claw arm disposed between the pair of brackets, wherein the claw arm has a lower portion and an upper portion, wherein the lower portion defines a curved slot;
   a slot fastener extending between and connecting to the pair of brackets, wherein the slot fastener is received through the curved slot;
   a pair of boomerang arms, each having a first wing tri-point, a second wing tri-point and a head tri-point, wherein each head tri-point is pivotably coupled to the pair of brackets about a lock limit pin;
   a pair of fork arms, each having a fork end and an opposing end, wherein each fork end is pivotably coupled to the second wing tri-point;
   an actuator operable to position the latch and lock mechanism in the locked configuration and the unlocked configuration; and
   an unlock limit pin extending between and coupled to the pair of brackets, wherein the unlock limit pin abuts an upper surface of the claw arm during positioning to the unlocked position,
   whereby the unlock limit pin guides the claw arm during said positioning.

2. The locking mechanism of claim 1, wherein the actuator has a first end and a second end, wherein the first end is pivotally coupled to the base element and wherein the second end is pivotally coupled to the pair of first wing tri-points.

3. The locking mechanism of claim 1, wherein the lock limit pin is disposed below a lower surface of the claw arm.

4. The locking mechanism of claim 2, wherein in the locked position the second wing tri-point is nearer to the base element than the head tri-point.

5. The locking mechanism of claim 2, wherein the claw arm provides a diagonal ramp element extends between the lower portion and the upper portion, the diagonal ramp element providing a portion of said upper surface.

6. A lock mechanism, comprising:
   a base element having a front edge and a back edge;
   a pair of brackets rigidly connected to the base element near the front edge;
   a claw arm disposed between the pair of brackets, wherein the claw arm has a lower portion and an upper portion, wherein the lower portion defines a curved slot;
   a slot fastener extending between and connecting to the pair of brackets, wherein the slot fastener is received through the curved slot;

a pair of boomerang arms, each having a first wing tri-point, a second wing tri-point and a head tri-point, wherein each head tri-point is pivotably coupled to the pair of brackets about a lock limit pin;

a pair of fork arms, each having a fork end and an opposing end, wherein each fork end is pivotably coupled to the second wing tri-point; and an actuator operable to position the latch and lock mechanism in the locked configuration and the unlocked configuration, wherein in the locked configuration the second wing tri-point is nearer to the base element than the head tri-point forming an angle past parallel condition preventing the lock mechanism from moving toward an unlocked configuration if actuator pressure is lessened.

7. The lock mechanism of claim 6, wherein the actuator has a first end and a second end, wherein the first end is pivotably coupled to the base element and wherein the second end is pivotably coupled to the pair of first wing tri-points.

8. The lock mechanism of claim 6, wherein the lock limit pin is disposed below a lower surface of the claw arm.

9. The lock mechanism of claim 7, further providing an unlock limit pin extending between and coupled to the pair of brackets, wherein the unlock limit pin is disposed above an upper surface of the claw arm farther from the front edge.

10. The lock mechanism of claim 7, wherein the claw arm provides a diagonal ramp element extends between the lower portion and the upper portion.

* * * * *